US011475875B2

(12) United States Patent
Chakravarthy et al.

(10) Patent No.: US 11,475,875 B2
(45) Date of Patent: Oct. 18, 2022

(54) METHOD AND SYSTEM FOR IMPLEMENTING LANGUAGE NEUTRAL VIRTUAL ASSISTANT

(71) Applicants: Sriram Chakravarthy, Saratoga, CA (US); Madhav Vodnala, San Jose, CA (US); Balakota Srinivas Vinnakota, Sunnyvale, CA (US); Ram Menon, Los Altos, CA (US)

(72) Inventors: Sriram Chakravarthy, Saratoga, CA (US); Madhav Vodnala, San Jose, CA (US); Balakota Srinivas Vinnakota, Sunnyvale, CA (US); Ram Menon, Los Altos, CA (US)

( * ) Notice: Subject to any disclaimer, the term of this patent is extended or adjusted under 35 U.S.C. 154(b) by 39 days.

(21) Appl. No.: 16/664,928

(22) Filed: Oct. 27, 2019

(65) Prior Publication Data

US 2020/0193966 A1 Jun. 18, 2020

Related U.S. Application Data

(60) Provisional application No. 62/751,004, filed on Oct. 26, 2018.

(51) Int. Cl.
*G06F 40/58* (2020.01)
*G10L 15/22* (2006.01)
(Continued)

(52) U.S. Cl.
CPC ............ *G10L 15/005* (2013.01); *G06F 40/47* (2020.01); *G06F 40/58* (2020.01); *G10L 15/22* (2013.01);
(Continued)

(58) Field of Classification Search
CPC ...................................................... G06F 40/58
See application file for complete search history.

(56) References Cited

U.S. PATENT DOCUMENTS

2004/0088163 A1* 5/2004 Schalkwyk ........... G10L 15/187
704/251
2007/0219797 A1* 9/2007 Liu ........................ G10L 15/08
704/257
(Continued)

OTHER PUBLICATIONS

Meng, Fandong, et al. "Encoding source language with convolutional neural network for machine translation." arXiv preprint arXiv: 1503.01838 (2015). (Year: 2015).*

*Primary Examiner* — Jialong He

(57) ABSTRACT

In one aspect, a computerized method useful for implementing a language neutral virtual assistant including the step of providing a language detector. The language detector comprises one or more trained language classifiers. With language detector identifying a language of an incoming message from a user to an artificially intelligent (AI) personal assistant. The method includes the step of receiving an incoming message to the AI personal assistant. The method includes the step of normalizing the incoming message, wherein the normalizing the incoming message comprises a set of spelling corrections and a set of grammar corrections. The method includes the step of translating the incoming message to a specified language with a specified encoding process and a specified decoding process. The method includes the step of providing an AI personal assistant engine that comprise an artificial intelligence which conducts a conversation via auditory or textual methods. The AI personal assistant engine provides outputs a response translator. The method includes the step of providing a response translator that uses the AI personal assistant engine output to provide a response to the user.

5 Claims, 11 Drawing Sheets

(51) Int. Cl.
    *G10L 15/00*      (2013.01)
    *G06F 40/47*      (2020.01)
    *G10L 15/30*      (2013.01)
(52) U.S. Cl.
    CPC ........ *G10L 15/30* (2013.01); *G10L 2015/223* (2013.01)

(56) References Cited

U.S. PATENT DOCUMENTS

| | | | | |
|---|---|---|---|---|
| 2009/0274299 | A1* | 11/2009 | Caskey | H04L 63/104 |
| | | | | 380/255 |
| 2012/0016678 | A1* | 1/2012 | Gruber | G10L 13/02 |
| | | | | 704/275 |
| 2014/0074454 | A1* | 3/2014 | Brown | G10L 15/08 |
| | | | | 704/9 |
| 2014/0288915 | A1* | 9/2014 | Madnani | G06F 40/58 |
| | | | | 704/2 |
| 2014/0303961 | A1* | 10/2014 | Leydon | G10L 13/08 |
| | | | | 704/2 |
| 2014/0337007 | A1* | 11/2014 | Waibel | G10L 13/02 |
| | | | | 704/3 |
| 2015/0095032 | A1* | 4/2015 | Li | G10L 15/08 |
| | | | | 704/255 |
| 2018/0129648 | A1* | 5/2018 | Chakravarthy | G06F 40/205 |
| 2018/0314689 | A1* | 11/2018 | Wang | G10L 15/07 |
| 2020/0066254 | A1* | 2/2020 | Hiroe | G10L 15/00 |
| 2020/0111484 | A1* | 4/2020 | Aleksic | G10L 15/02 |
| 2021/0064828 | A1* | 3/2021 | Johnson Premkumar | G06F 40/51 |

* cited by examiner

METHOD AND SYSTEM FOR IMPLEMENTING LANGUAGE NEUTRAL VIRTUAL ASSISTANT

CLAIM OF PRIORITY

This application claims priority to U.S. Provisional Application No. 62/751,004, titled METHOD AND SYSTEM FOR IMPLEMENTING LANGUAGE NEUTRAL VIRTUAL ASSISTANT, and filed on 26 Oct. 2018. This application is incorporated herein by reference.

BACKGROUND

Users may wish to query various enterprises about particular topics. User can use various messaging services to contact said entities. For example, a user may contact a bank via a messaging application to inquire about banking hours or other services. Automated assistants are increasingly in popularity and utility. Accordingly, rather than using a human agent to respond, many entities are utilizing Automated assistants to respond to the user's query.

BRIEF SUMMARY OF THE INVENTION

In one aspect, a computerized method useful for implementing a language neutral virtual assistant including the step of providing a language detector. The language detector comprises one or more trained language classifiers. With language detector identifying a language of an incoming message from a user to an artificially intelligent (AI) personal assistant. The method includes the step of receiving an incoming message to the AI personal assistant. The method includes the step of normalizing the incoming message, wherein the normalizing the incoming message comprises a set of spelling corrections and a set of grammar corrections. The method includes the step of translating the incoming message to a specified language with a specified encoding process and a specified decoding process. The method includes the step of providing an AI personal assistant engine that comprise an artificial intelligence which conducts a conversation via auditory or textual methods. The AI personal assistant engine provides outputs a response translator. The method includes the step of providing a response translator that uses the AI personal assistant engine output to provide a response to the user.

Figure 3:
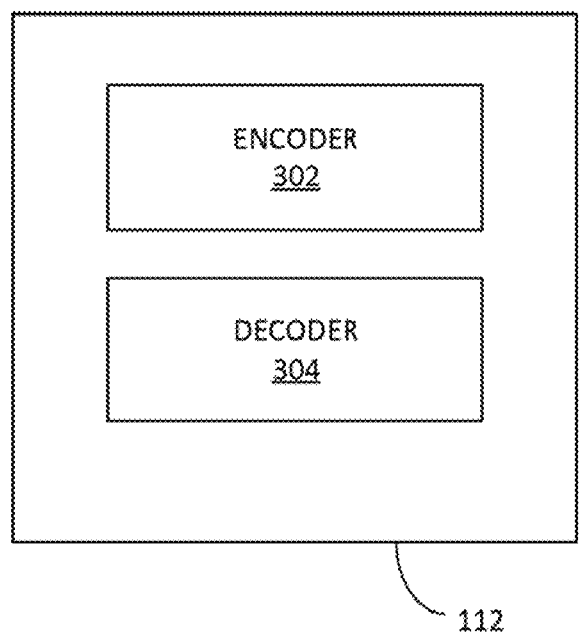

An example response translator is provided in FIG. 3, according to some embodiments.

Figure 4:
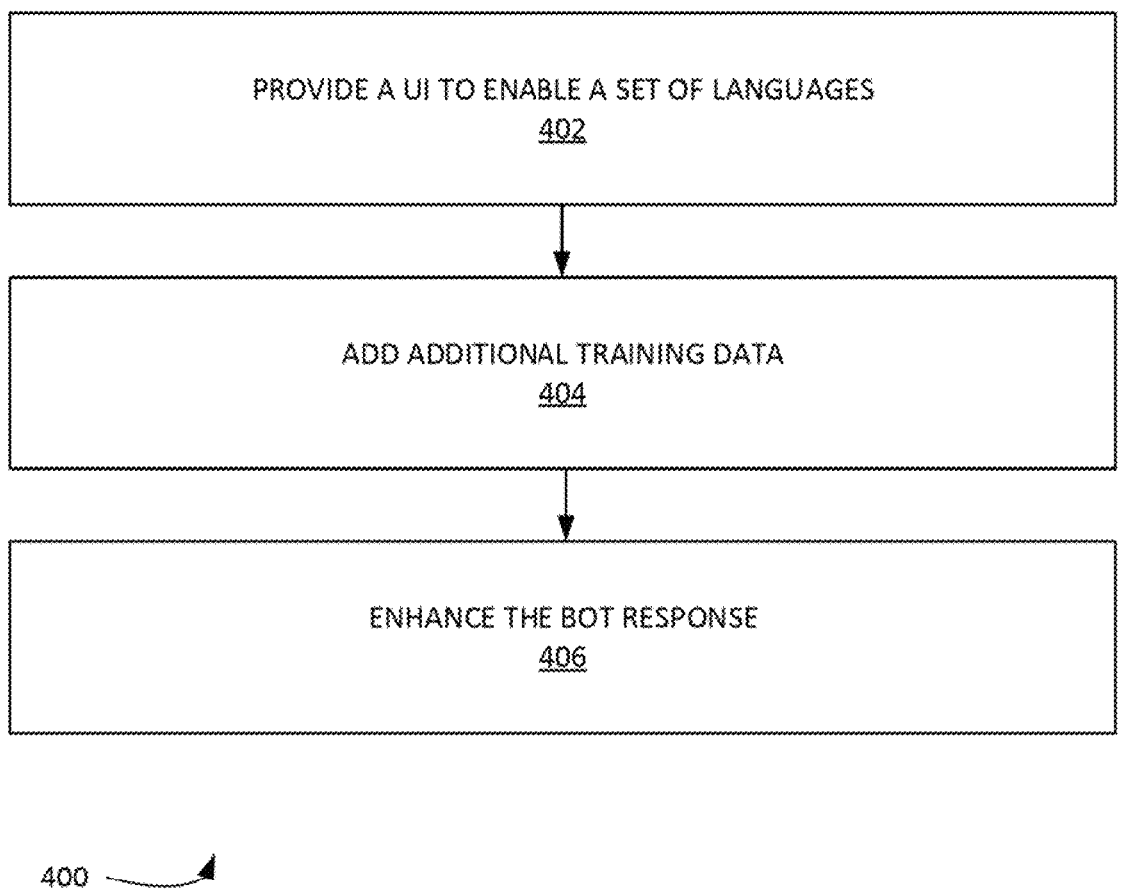

FIG. 4 illustrates an example process for managing a conversational AI platform, according to some embodiments.

Figure 5:
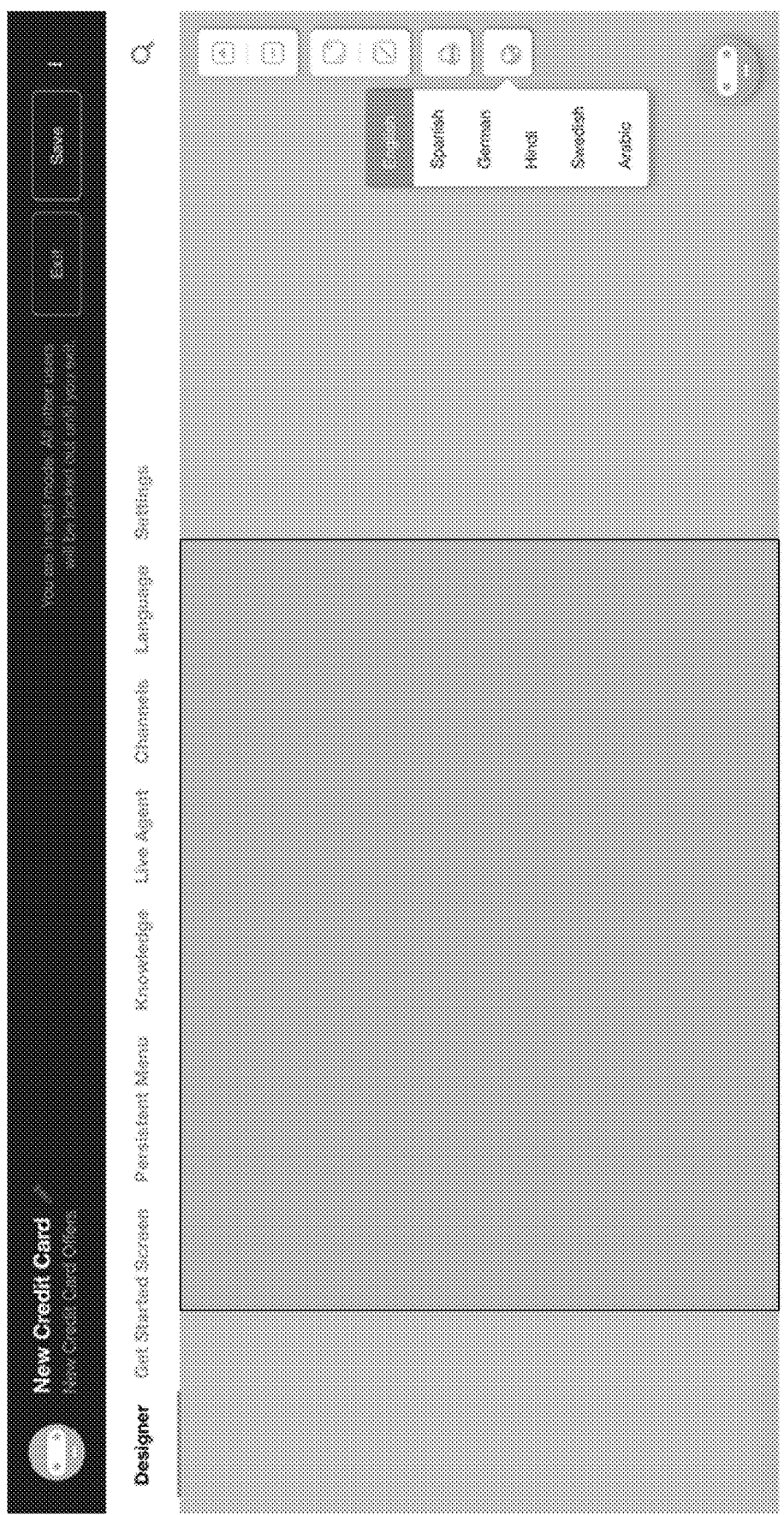

FIG. 5 illustrates an example relevant screen shot illustrating the ability to dynamically change the language of the response and control from a single view.

Figure 6:
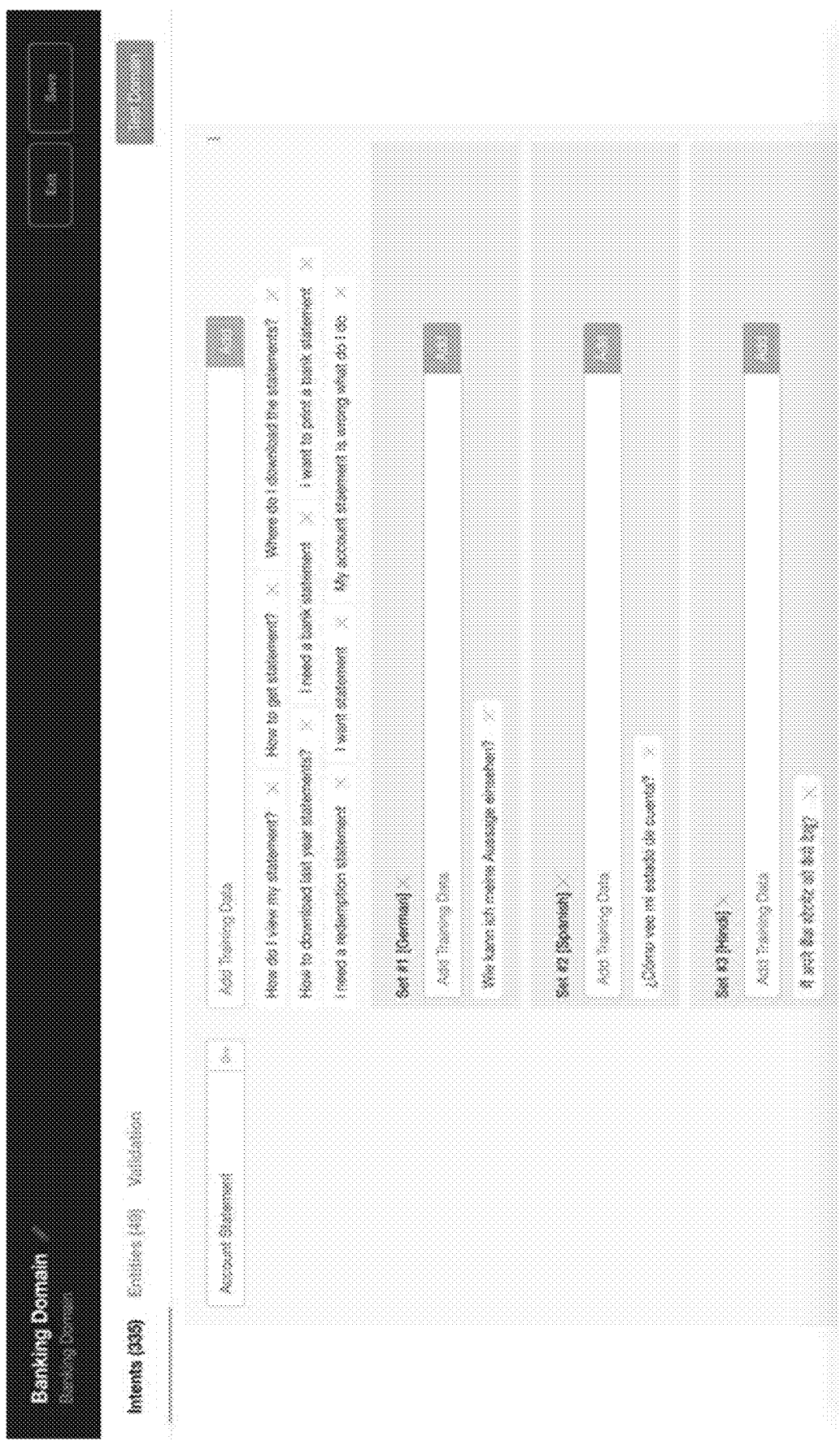

FIG. 6 illustrates an example relevant screen shot for adding additional training data, according to some embodiments.

Figure 7:
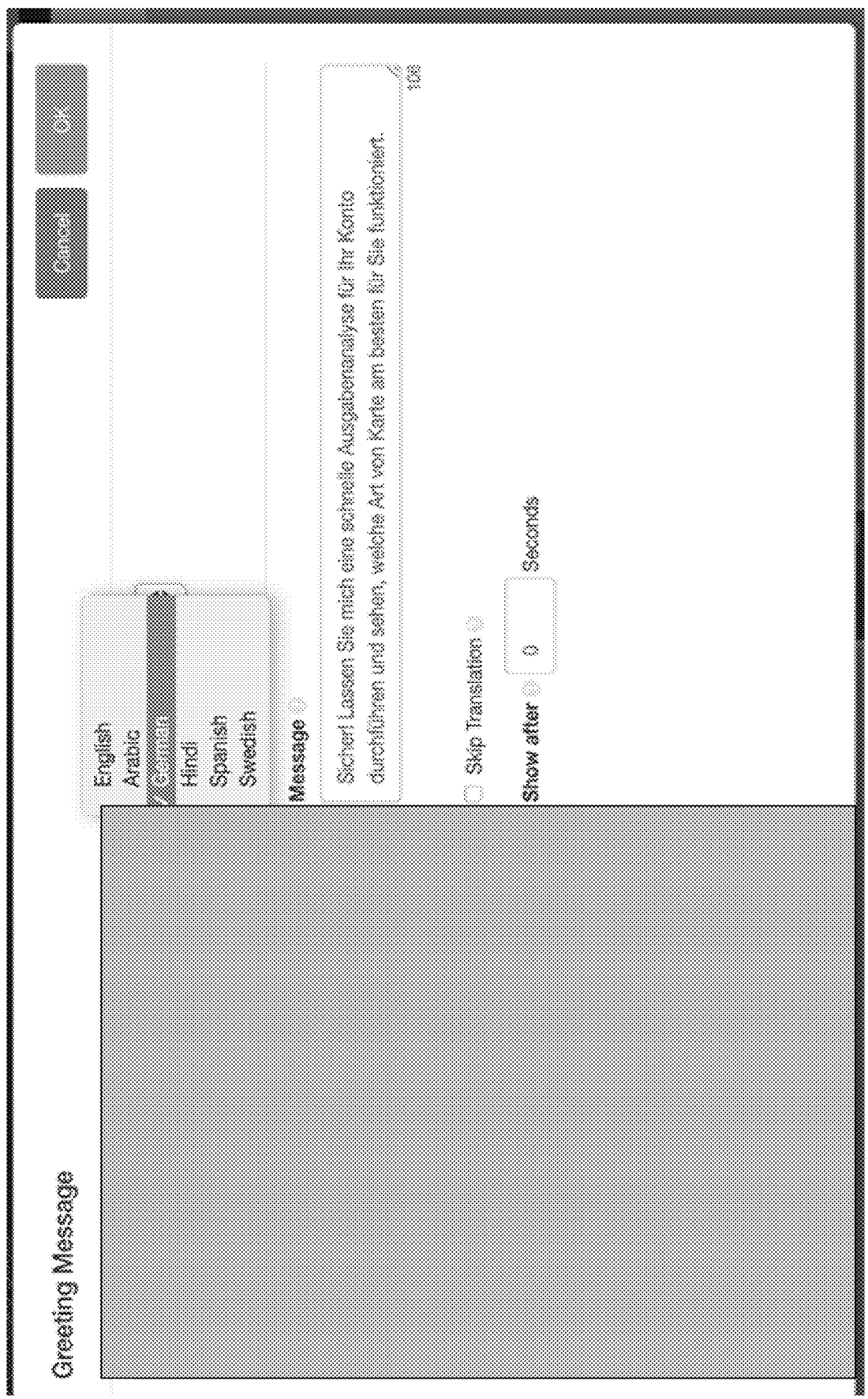

FIG. 7 illustrates an example relevant screen shot with a representation of the bot response in different language and ability for the bot developer to modify them.

Figure 8:
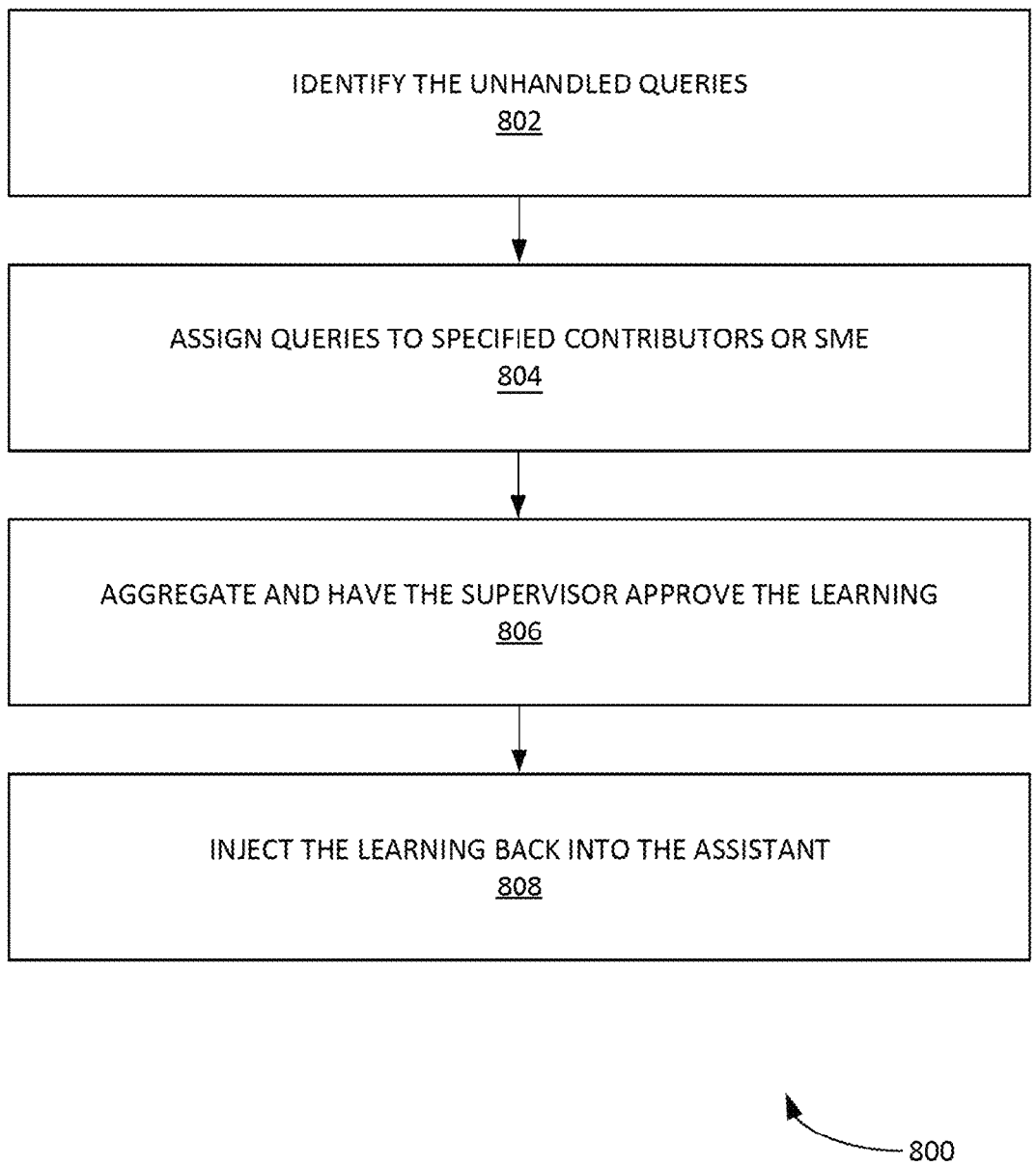

FIG. 8 illustrates an example process for assisted learning of an AI virtual assistant, according to some embodiments.

Figure 9:
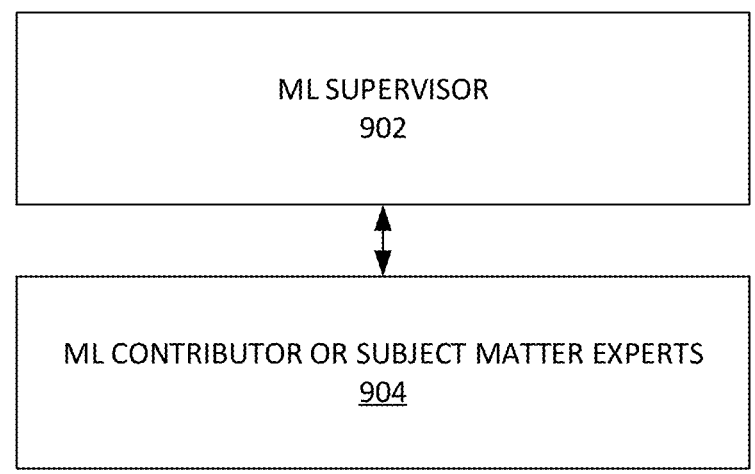

FIG. 9 illustrates an example architecture for implementing the supervised learning process, according to some embodiments.

Figure 10:
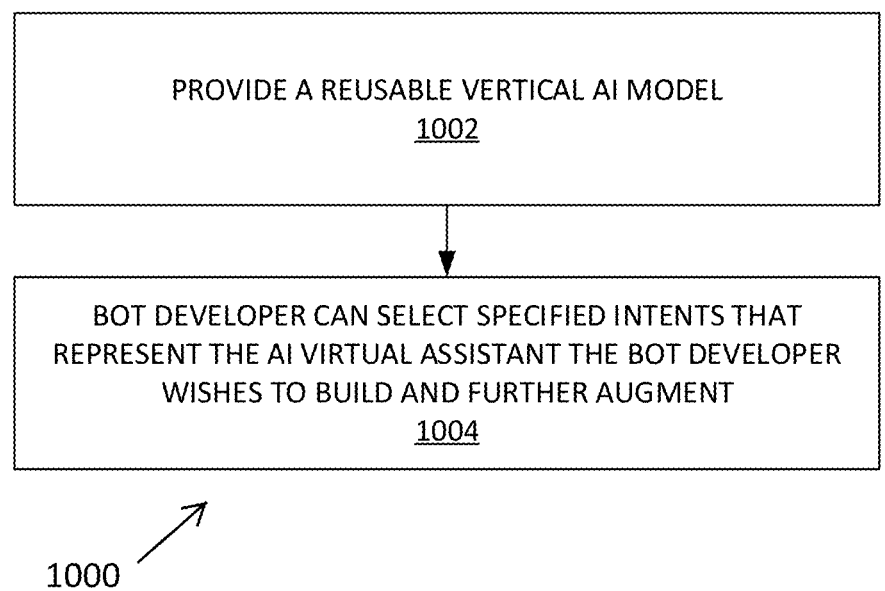

FIG. 10 illustrates an example process for implementing reusable vertical AI models, according to some embodiments.

Figure 11:
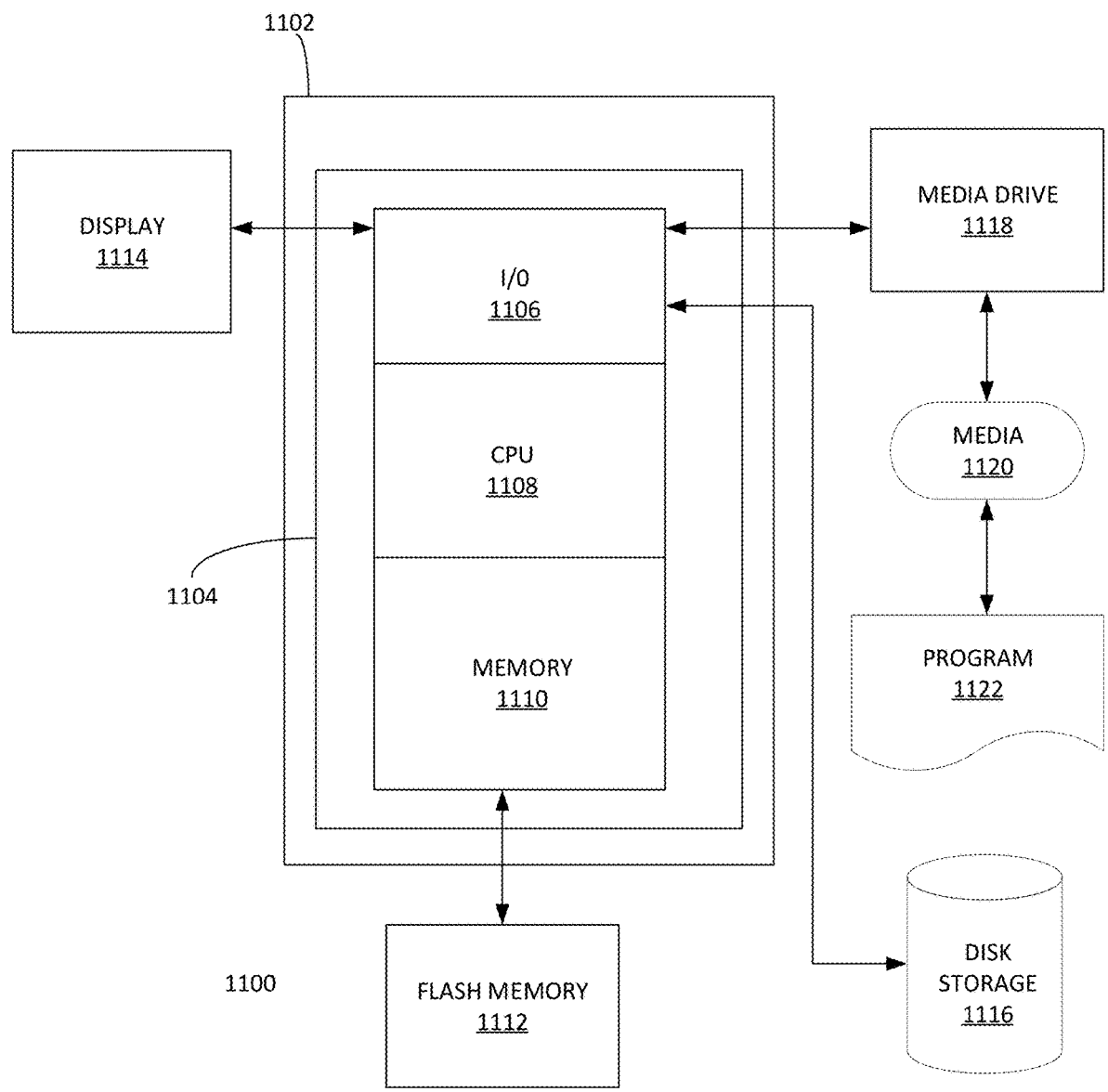

FIG. 11 depicts an exemplary computing system that can be configured to perform any one of the processes provided herein.

The Figures described above are a representative set and are not an exhaustive with respect to embodying the invention.

DESCRIPTION

Disclosed are a system, method, and article of implementing language neutral virtual assistant. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method.

Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can specify how software components of various systems interact with each other.

Cloud computing can involve deploying groups of remote servers and/or software networks that allow centralized data storage and online access to computer services or resources. These groups of remote serves and/or software networks can be a collection of remote computing services.

Dashboard can be a webpage, application page or other user interface that, inter alia, collates information and enables a user to interact with said information to create application broadcast messages, form templates, survey templates, digital information presentations (e.g. in a slide-show format, etc.), digital information summaries, data management operations, database queries, Internet access, etc.

Instant messaging can include a type of online chat that offers real-time text transmission over the Internet.

Knowledge base can be a store complex structured and unstructured information. The knowledge base can include enterprise information.

Inference Engine can be an Artificial Intelligence tool (e.g. an expert system).

Information retrieval can be the activity of obtaining information resources relevant to an information need from a collection of information resources. Searches can be based on metadata and/or on full-text (or other content-based) indexing. Example information retrieval methods that can be implemented herein include, inter alia: expert search finding, genomic information retrieval, geographic information retrieval, information retrieval for chemical structures, information retrieval in software engineering, legal information retrieval, and/or vertical search.

Intelligent personal assistant (e.g. an AI virtual assistant, etc.) can refer to a software agent that can perform various tasks or services (e.g. online tasks or services, etc.) for a user.

Language identification/detection determines which natural language a given content is in. Language identification utilizes a computational solved with various statistical methods.

Machine learning is a type of artificial intelligence (AI) that provides computers with the ability to learn without being explicitly programmed. Machine learning focuses on the development of computer programs that can teach themselves to grow and change when exposed to new data.

Natural language processing (NLP) is a field of computer science, artificial intelligence, and computational linguistics concerned with the interactions between computers and human (natural) languages.

Supervised learning is the machine learning task of learning a function that maps an input to an output based on example input-output pairs. It infers a function from labeled training data consisting of a set of training examples. In supervised learning, each example is a pair consisting of an input object (typically a vector) and a desired output value (also called the supervisory signal). A supervised learning algorithm analyzes the training data and produces an inferred function, which can be used for mapping new examples. An optimal scenario can allow for the algorithm to correctly determine the class labels for unseen instances. This uses the learning algorithm to generalize from the training data to unseen situations in a reasonable way.

Exemplary Methods

Figure 1:
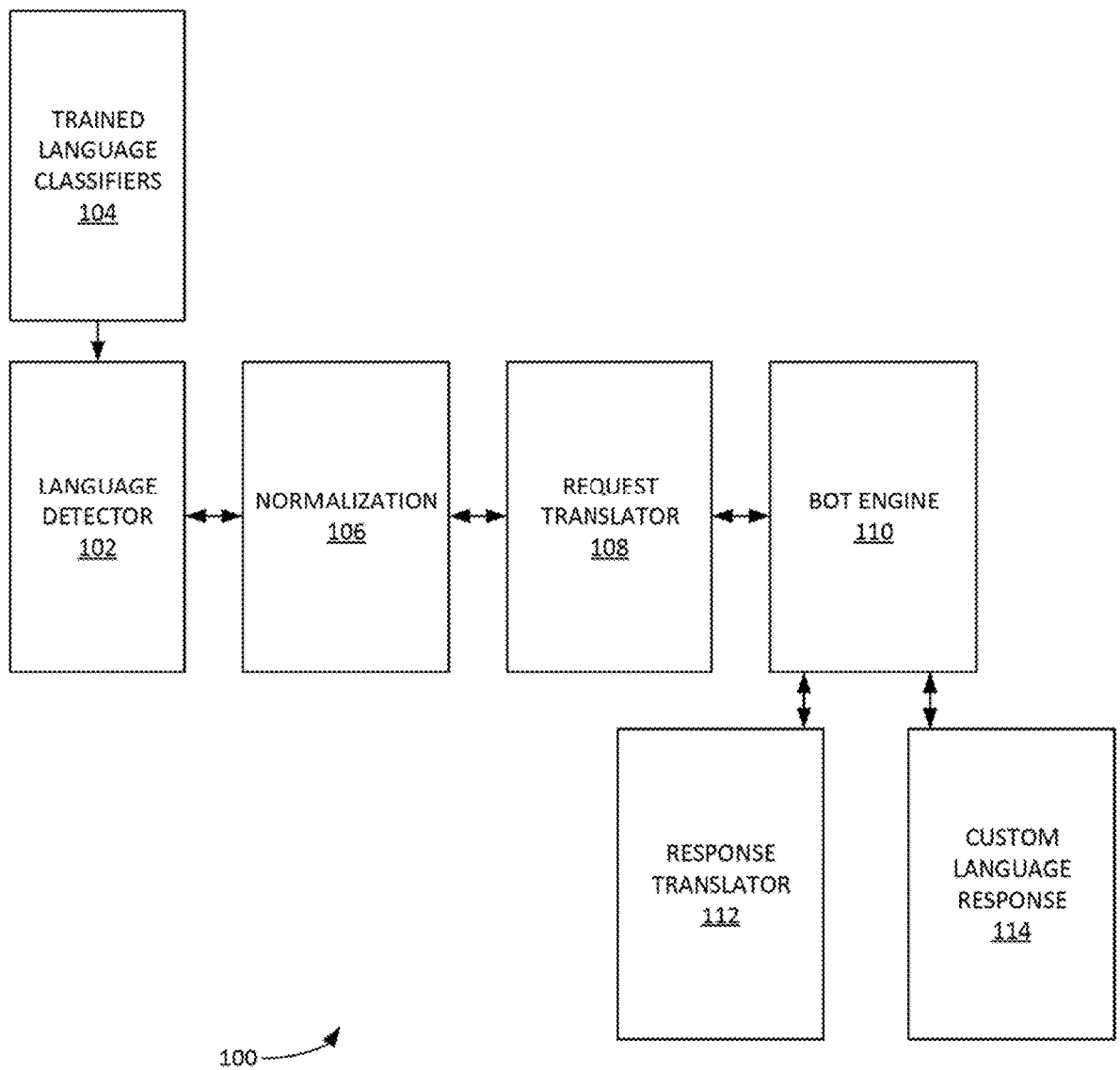
FIG. 1 illustrates an example process of implementing a conversational AI platform, according to some embodiments.

FIG. 1 illustrates an example process 100 of implementing an implementing language neutral virtual assistant, according to some embodiments. Process 100 can identify a language developing a "language neutral" machine-learning (ML) model for the representation of a set of training data associated with each intent. A bot developer can also add additional training data specific to each language and those language specific models are also stored as distinct ML models. Accordingly, process 100 can use include various machine learning functionalities/algorithms such as, inter alia: clustering, classification, support vector machines (SVM), etc.

The idea is to ensure a bot can be designed and developed in a single language (English) and trained to respond to questions coming in from different languages and domain specific learning associated with one language can also be applied to other languages In addition to the models, process 100 can manage the responses that return to the user in a single representation. The single representation can be dynamically switched to show how the bot/AI personal assistant responds to the user in different languages. The response can be in the language the question was asked in.

In step 102, a language detector can be implemented. The language detector can use language identification algorithms/methods to identify a language of an incoming message from a user to an AI personal assistant. Language detector can use trained language classifiers 104. In step 106, process 100 can normalize the incoming message. Normalization can include, inter alia: spelling/grammar corrections, entity replacement, etc.

Figure 2:
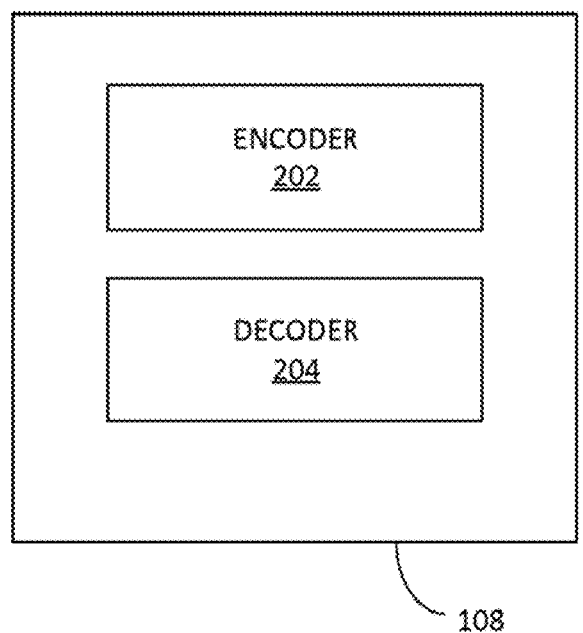
FIG. 2 illustrates an example language translation entity, according to some embodiments.

In step 108, the language translation is implemented. FIG. 2 illustrates an example language translation entity, according to some embodiments. Step 108 can include an encoding process 202 and a decoding process 204. Encoding process 202 can obtain a language text (e.g. in Bangla, Hindi, Russian, Portuguese, English, etc.) and convert it to a language vector. Decoding process 204 can place the output language vector into a normalized language. It can also detect mixed languages like Banglish, Hinglish (Hindi written in English)

The bot engine can then operate on the user input in step 110. The bot engine can include a computer program and/or an artificial intelligence which conducts a conversation via auditory or textual methods. Bot engine output can be provided to a response translator. Response translator can use the output of the bot engine to provide a response to a user in step 112. Bot developer can also refine the response/output to refine the translations An example response translator is provided in FIG. 3, according to some embodiments. Step 112 can include an encoding process 302 and a decoding process 304. Encoding process 302 can obtain a normalized language output of bot engine and convert it to a language vector. A meaning vector can be determined from the language vector. Decoding process 204 can place the meaning vector to a specified language text (e.g. in Bangla, Hindi, Russian, Portuguese, English, etc.) for output to the user (e.g. a user interaction with a chatbot, AI personal assistant, etc. using process 100) as a custom language output. In step 114, the custom language output can be formatted and communicated to the user-side machine.

FIG. 4 illustrates an example process 400 for managing a conversational AI platform, according to some embodiments. In step 402, process 400 can provide a UI to enable a set of languages. By enabling a language system, process 400 can automatically generate the base training data and bot responses from English (and/or other specified languages). FIG. 5 illustrates an example relevant screen shot illustrating the ability to dynamically change the language of the response and control from a single view.

In step 404, process 400 can add additional training data. Training data can optionally be specified in different languages to further enhance accuracy of the bot/AI personal assistant. FIG. 6 illustrates an example relevant screen shot for adding additional training data.

In step 406, process 400 can enhance the bot response. In this step, the bot developer is allowed to edit/enhance the auto generated bot response or provide a completely new bot response. FIG. 7 illustrates an example relevant screen shot with a representation of the bot response in different language and ability for the bot developer to modify them.

FIG. 8 illustrates an example process 800 for assisted learning of an AI virtual assistant, according to some embodiments. Process 800 can enable an AI virtual assistant to continuously learn based on interactions. Process 800 can enable assisted learning where n AI virtual assistant can learn based on responses that has been provided by a live agent and/or based on other supervised/assisted learning techniques. Process 800 enable learning in a supervised fashion.

Supervised/assisted learning sources for the assistant can include, inter alia: live agents; users providing active feedback; expert review by key subject matter experts (SMEs) in an organization; other enterprise users who might have access to the appropriate information; other automated data sources; etc. Process 800 can provide a consistent method to review at the unhandled messages to be trained, validated and injected back into the AI virtual assistant to provide higher quality responses. SME can train the bot in the language of choice and the training is applicable across all other languages.

More specifically, in step 802 process 800 can identify the unhandled queries to an AI virtual assistant. In step 804, process 800 can assign queries to specified contributors or SMEs. In step 806, process 800 can aggregate and have the supervisor approve the learning. In step 808, process 800 can inject the learning back into the assistant.

FIG. 9 illustrates an example architecture for implementing the supervised learning process, according to some embodiments. ML Supervisor 902 can review the bot/AI virtual assistant performance in an analytics screen (e.g. see supra). ML contributor and/or SMEs 904 can review individual bot/AI virtual assistant responses and provides appropriate feedback. Example feedback can be "good response" or "inappropriate response"; thumbs up or thumbs down, etc.

FIG. 10 illustrates an example process 1000 for implementing reusable vertical AI models, according to some embodiments. A reusable Vertical AI domain can include the associated ML models for the domain/sub-domain that are devoid of any specific company/user specific elements. Process 1000 can enable a reusable vertical AI model to be reused across assistants across a specified domain.

Process 1000 can implement data masking to ensure none of the enterprise specific data is ever used across domains for other customers. Process 1000 can implement process abstraction to remove any process specific information/flows. Process 1000 can implement PII identification and removal to identify and remove PII information while preserving the object representation used to define the utterances and slot related information. Process 1000 can implement abstraction of integration to remove any associated implementation detail including integration to back-end applications. Process 1000 can implement fine-grained domain data operations to extract reusable pieces of domain information/data. Process 1000 can implement continuous training of the domain data. Process 1000 can implement language specific domain data operations on training data that is associated with a specific language.

More specifically, in step 1002, process 1000 can provide a reusable vertical AI model. The reusable vertical AI models can be used as starting point for the development of virtual assistant specific to a domain. In step 1004, the bot developer can select specified intents that represent the AI virtual assistant the bot developer wishes to build and further augment. Example intents can include, inter alia: chat transcripts; voice transcripts; search queries; support logs; etc.

Example Computing Systems

FIG. 11 depicts an exemplary computing system 1100 that can be configured to perform any one of the processes provided herein. In this context, computing system 1100 may include, for example, a processor, memory, storage, and I/O devices (e.g., monitor, keyboard, disk drive, Internet connection, etc.). However, computing system 1100 may include circuitry or other specialized hardware for carrying out some or all aspects of the processes. In some operational settings, computing system 1100 may be configured as a system that includes one or more units, each of which is configured to carry out some aspects of the processes either in software, hardware, or some combination thereof.

FIG. 11 depicts computing system 1100 with a number of components that may be used to perform any of the processes described herein. The main system 1102 includes a motherboard 1104 having an I/O section 1106, one or more central processing units (CPU) 1108, and a memory section 1110, which may have a flash memory card 1112 related to it. The I/O section 1106 can be connected to a display 1114, a keyboard and/or other user input (not shown), a disk storage unit 1116, and a media drive unit 1118. The media drive unit 1118 can read/write a computer-readable medium 1120, which can contain programs 1122 and/or data. Computing system 1100 can include a web browser. Moreover, it is noted that computing system 1100 can be configured to include additional systems in order to fulfill various functionalities. Computing system 1100 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

The invention claimed is:

1. A computerized method useful for implementing a language neutral virtual assistant comprising:
   providing a language detector, wherein the language detector comprises one or more trained language classifiers;
   with the language detector identifying a language of an incoming message from a user to an artificially intelligent (AI) personal assistant;
   receiving an incoming message to the AI personal assistant;
   normalizing the incoming message, wherein the normalizing the incoming message comprises a set of spelling corrections and a set of grammar corrections;
   translating the incoming message to a specified language with a specified encoding process and a specified decoding process;
   providing an AI personal assistant engine that comprise an artificial intelligence which conducts a conversation via auditory or textual methods, wherein the AI personal assistant engine provides outputs a response translator;
   providing a response translator that uses the AI personal assistant engine output to provide a response to the user;
   wherein the encoding process comprises:
      obtaining a language text of the incoming message and converting the language text to a language vector,
   wherein the decoding processes comprises receiving the language vector and converting the language vector into a normalized language, and
   wherein the language text of the incoming message comprises a hybrid language of two or more standardized languages;
   managing the response that returns to the user a single representation response, wherein the single representation response is dynamically switched to provide information of how the AI personal assistant responds to the user in different languages;
   identifying a language by developing a language neutral machine-learning (ML) model for a representation of a set of training data associated with each intent;
   implementing a supervised ML process, wherein an ML Supervisor reviews an AI personal assistant performance in an analytics screen and provides appropriate feedback; and
   providing a reusable vertical AI model, wherein the reusable vertical AI model is used as a starting point for a development of AI personal assistant specific to a specified domain.

2. The computerized method of claim 1, the AI personal assistant engine refines the output to refine the translation of the incoming message.

3. The computerized method of claim 1, wherein the normalizing of the incoming message comprises an entity replacement.

4. A computer system useful for implementing a language neutral virtual assistant comprising:
   a processor;
   a memory containing instructions when executed on the processor, causes the processor to perform operations that:
   provide a language detector, wherein the language detector comprises one or more trained language classifiers;
   with the language detector, identify a language of an incoming message from a user to an artificially intelligent (AI) personal assistant;
   receive an incoming message to the AI personal assistant;
   normalize the incoming message, wherein the normalization the incoming message comprises a set of spelling corrections and a set of grammar corrections;
   translate the incoming message to a specified language with a specified encoding process and a specified decoding process;
   provide an AI personal assistant engine that comprise an artificial intelligence which conducts a conversation via auditory or textual methods, wherein the AI personal assistant engine provides outputs a response translator;
   provide a response translator that uses the AI personal assistant engine output to provide a response to the user;
   obtain a language text of the incoming message and converting the language text to a language vector;
   wherein the decoding processes comprises receiving the language vector and converting the language vector into a normalized language;
   wherein the language text of the incoming message comprises a hybrid language of two or more standardized languages;
   identifying a language by developing a language neutral machine-learning (ML) model for a representation of a set of training data associated with each intent;
   implementing a supervised ML process, wherein an ML Supervisor reviews an AI personal assistant performance in an analytics screen and provides appropriate feedback; and
   providing a reusable vertical AI model, wherein the reusable vertical AI model is used as a starting point for a development of AI personal assistant specific to a specified domain.

5. The computerized system of claim 4, the AI personal assistant engine refines the output to refine the translation of the incoming message.

* * * * *